(12) United States Patent
Schmidt et al.

(10) Patent No.: US 10,781,880 B2
(45) Date of Patent: Sep. 22, 2020

(54) AXIAL DAMPER

(71) Applicant: LISEGA SE, Zeven (DE)

(72) Inventors: Gunnar Schmidt, Elsdorf/Frankenbostel (DE); Heinz-Wilhelm Lange, Zeven (DE)

(73) Assignee: LISEGA SE, Zeven (DE)

( * ) Notice: Subject to any disclaimer, the term of this patent is extended or adjusted under 35 U.S.C. 154(b) by 0 days.

(21) Appl. No.: 15/563,827

(22) PCT Filed: Mar. 11, 2016

(86) PCT No.: PCT/EP2016/055302
§ 371 (c)(1),
(2) Date: Oct. 2, 2017

(87) PCT Pub. No.: WO2016/156016
PCT Pub. Date: Oct. 6, 2016

(65) Prior Publication Data
US 2018/0094693 A1 Apr. 5, 2018

(30) Foreign Application Priority Data

Apr. 2, 2015 (DE) .................. 10 2015 105 181

(51) Int. Cl.
*B60G 13/00* (2006.01)
*F16F 9/54* (2006.01)
(Continued)

(52) U.S. Cl.
CPC ................ *F16F 9/54* (2013.01); *F16F 3/023* (2013.01); *F16F 9/103* (2013.01); *F16F 2230/0023* (2013.01); *F16F 2230/0082* (2013.01)

(58) Field of Classification Search
CPC .... B60G 13/001; B60G 13/005; B60G 11/12; B60G 11/16; F16F 9/54
(Continued)

(56) References Cited

U.S. PATENT DOCUMENTS 2,581,048 A * 1/1952 Schaefer ................ B23K 5/006
403/268
3,556,617 A * 1/1971 Axthammer et al. .. F16F 9/362
384/16
(Continued)

FOREIGN PATENT DOCUMENTS

CN 101985290 3/2011
DE 2433583 1/1976
(Continued)

OTHER PUBLICATIONS

English translation of International Search Report rom corresponding PCT Application No. PCT/EP2016/055302 dated Jun. 22, 2016.
(Continued)

*Primary Examiner* — Christopher P Schwartz
(74) *Attorney, Agent, or Firm* — Grossman, Tucker, Perreault & Pfleger, PLLC

(57) ABSTRACT

This invention relates to a damping device for mounting two separate components for damping oscillations between the components, wherein the damping device has an axial damper that comprises a first connecting element as well as a second connecting element, wherein the first connecting element is connected to the second connecting element via a damping section by ensuring an axial relative movement of the two connecting elements with respect to one another, wherein the damping section is designed for damping the axial relative movement between the connecting elements. The damping device comprises a bending joint 1 that is fastened to one of the connecting elements, wherein the bending joint has a mounting element for mounting on one
(Continued)

of the components, wherein the bending joint has a joint section that is designed as a continuous rigidly interconnected component and that extends axially between the connecting element fixed to the bending joint and the mounting element, wherein the bending joint can be bent, in particular resiliently bent, in its joint section about at least one axis of rotation that is perpendicular to the axial direction.

19 Claims, 7 Drawing Sheets

(51) Int. Cl.
  *F16F 3/02* (2006.01)
  *F16F 9/10* (2006.01)
(58) Field of Classification Search
  USPC ......... 188/322.19, 321.11; 248/200.1, 205.1; 280/124.109, 124.116; 267/195
  See application file for complete search history.

(56) References Cited

U.S. PATENT DOCUMENTS

| | | | |
|---|---|---|---|
| 3,679,029 A * | 7/1972 | Thomas | B60G 13/005 188/321.11 |
| 3,986,693 A * | 10/1976 | Johnson | B60G 11/16 248/205.1 |
| 4,084,837 A | 4/1978 | Milner | |
| 5,431,363 A * | 7/1995 | Ezzat | B60G 11/12 248/205.1 |
| 6,988,718 B1 | 1/2006 | Eulenbach et al. | |
| 8,684,339 B2 | 4/2014 | Deml et al. | |
| 2003/0160372 A1 * | 8/2003 | Klitsch | B60G 13/001 267/195 |
| 2005/0087413 A1 * | 4/2005 | Muller | F16F 9/54 188/322.19 |

FOREIGN PATENT DOCUMENTS

| | | |
|---|---|---|
| DE | 3041878 | 6/1982 |
| DE | 19932868 | 1/2001 |
| DE | 19943903 | 3/2001 |
| DE | 102006016701 | 10/2007 |
| EP | 1803964 | 7/2007 |
| JP | S45-10280 | 4/1970 |
| WO | 96/19682 | 6/1996 |
| WO | 2009/028941 | 3/2009 |

OTHER PUBLICATIONS

Office Action from related Chinese Appln. No. 201680032483.0, dated Dec. 5, 2018.
Office Action from related Japanese Appln. No. 2017-551604, dated Sep. 18, 2018. English translation attached.

* cited by examiner

AXIAL DAMPER

FIELD

The invention relates to a damping device for mounting between two separate components for damping oscillations between the components.

BACKGROUND

Generic damping devices are used for damping force effects such as, for example, force impacts, onto components. Generic damping devices are used, for example, for piping construction in order to damp oscillations of pipes with respect to other components such as, for example, a building. For example, generic damping devices are used to damp oscillations of machine parts with respect to a machine housing. For example, generic damping devices are used for damping oscillations between components of buildings that can arise, for example, in cases of earthquake. In this respect, generic damping devices always have an axial damper that has two connecting elements spaced from each other in the axial direction that are connected by a damping section arranged axially between the two connecting elements so that they can perform an axial relative movement to one another, wherein the damping section limits the axial relative movements to a range of displacement and damps them in the axial direction.

Depending on the field of application, there exist different embodiments of such axial dampers. For example, such axial dampers are designed as hydraulic dampers, eddy current dampers, viscous dampers or solid material dampers. The axial dampers mentioned as examples differ in their operating principle with which their damping section damps the axial relative movement of the two connecting elements. However, here all the axial dampers are designed in such a manner that they indeed allow a relative movement in the axial direction of the connecting elements with respect to one another within the range of displacement, whereas they remain rigid in all the directions perpendicularly to the axial direction. A relative force effect between the first and the second connecting element perpendicularly to the axial direction thus always implies an unintentional stress of the axial damper since the axial damper is purposefully designed only for allowing a relative movement in axial direction.

Since it can come, when properly using generic damping devices between two axially spaced components, to changes of positions of the components perpendicularly to the axial direction, generic damping devices must comprise means with which an excessive stress of the axial damper perpendicularly to the axial direction can be impeded. These means are usually made available in that the axial damper with its connecting elements is not directly and rigidly connected to the two connecting elements but pivot bearings or ball joints are provided on the connecting elements of the axial damper by which each of the connecting elements is connected to a component. This being, the pivot bearings or the ball joints are placed with such an orientation to the axial damper that the radius of the circular ring of a pivot bearing or the radius of the ball of a ball joint is oriented parallel to the axial direction of the axial damper or of the damping device so that there is a flexibility perpendicularly to the axial direction. A connection of the connecting element to the associated component can take place via the pivot bearings so that a tilting of the connecting element to the component about an axis of rotation perpendicularly to the axial direction is made possible. A tilting of the connecting element and of the connected component is made possible by a ball joint about a plurality of axes of rotation.

Conventional damping devices for which an axial damper is connected to the two components by pivot bearings or ball joints have significant drawbacks due to their construction. Due to their construction, the bearings always have some bearing clearance in the radial direction of the bearing and thus in the axial direction of the damping device. Thus, due to their construction, pivot bearings always have a radial bearing gap between the bearing rings. Moreover, depending on the fit of the bearing bolt, in particular for cylindrical bearing bolts, a radial clearance with respect to the bearing inner ring may exist. Generic damping devices are purposefully provided in the axial direction between two components that perform relative movements in the axial direction, usually oscillations or impacts, wherein the damping devices are purposefully used for damping this axial relative movement of the components. Here the providing of pivot bearings or of ball joints in generic damping devices always implies that radial impacts arise for each axial relative movement in the pivot bearings or in the ball joints. These radial impacts in the pivot bearings or in the ball joints that inevitably take place with the proper use of the damping devices result in a heavy stress of the pivot bearings or of the ball joints. In particular the impacts result in a continuous increase of the bearing clearance. This is, on the one hand, generally unwanted in damping devices since damping devices should react as immediately as possible to axial relative movements of the components with respect to each other so that the relative movements can be immediately damped. This being, it should be taken into account that generic damping devices are usually mostly used to damp axial relative movements of components in the range of a few millimeters to one another. On the other hand, a growing increase of the bearing clearance inevitably results in a destruction of the bearings and thus to a malfunction of the whole damping device. Moreover, the providing of pivot bearings or of ball joints in the damping devices implies high costs. Moreover, it is known from the document DE 10 2006 016 701 A1 of the state in the art to fix a vibration reducing piston and cylinder unit by means of a fixing part to a wheel suspension of a vehicle, wherein this fixing part has a base, a shaft and a fork and the central axes of the base and of the fork are situated on a common axis and the central axis of the shaft extends at a distance parallel to the common axis. This predefines a buckling direction for the fixing part so that, when an excessive stress arises, no other vehicle parts undergo a permanent deformation but only the fixing part in its buckling direction and thus gets damaged. Furthermore, a bearing for the vibration isolation of different machine elements movable with respect to one another is known from the document EP 1 803 964 A2 of the state in the art. The bearing comprises an axial damper that is connected at each of its two axial ends to a swivel joint for reducing the horizontal stiffness of the bearing.

SUMMARY

The aim of this invention is to make available a damping device that can be produced as easily and cost-effectively as possible and that eliminates in particular at least one of the above described drawbacks of conventional damping devices.

As a solution for achieving the above-mentioned aim of the invention, the invention proposes a damping device for mounting between two separate components for damping oscillations between the components. The damping device according to the invention is designed for being mounted between two separate components for damping oscillations between the components. The damping device comprises an axial damper that has a first connecting element and a second connecting element. The axial damper can be connected by the first connecting element to a first component and by the second connecting element to a second component. The first connecting element is connected to the second connecting element by a damping section while ensuring an axial relative movement of the two connecting elements with respect to one another, wherein the damping section is designed for damping the axial relative movement between the connecting elements. The axial damper of the damping device according to the invention thus comprises the two connecting elements and the damping section. The damping section is placed axially, i.e. in the axial direction, between the first connecting element and the second connecting element. The first connecting element is placed on an axial side of the damping section and the second connecting element on the other axial side of the damping section. This being, the axial extension of the damping section can be variable. The damping section thus connects the two connecting elements by ensuring an axial displaceability, in particular an axial displaceability within a range of axial displacement, of the two connecting elements. According to the invention, the damping device comprises a bending joint that is fastened to one of the connecting elements. The bending joint has a mounting element for mounting on one of the two components. Moreover, the bending joint has a joint section that is designed as a continuous rigidly interconnected component and that extends axially between the connecting element fixed to the bending joint and the mounting element, wherein the bending joint can be resiliently bent in its joint section about at least one axis of rotation that is perpendicular to the axial direction, wherein the joint section has at least one axial bending section that is associated to exactly one axis of rotation perpendicularly to the axial direction and that remains rigid with respect to a bending stress that is exerted on itself by a relative force applied at its axial ends with a direction of force along its axis of rotation, wherein the bending section has a shape in the manner of a plate, the planar extension of which is fixed by the axial direction and by the axis of rotation associated thereto, wherein the bending section has a length of extension in a direction perpendicular to the axial direction and perpendicular to the axis of rotation associated to the bending section that is less than 5% of the axial length of extension of the bending section and wherein the bending section has a length of extension along its associated axis of rotation that is at least four times bigger than the length of extension of the bending section in the direction that is perpendicular to its associated axis of rotation and perpendicular to the axial direction, wherein the joint section of the bending joint is made from full material.

In an embodiment, the joint section is produced as an integrally one-piece element. In an embodiment, the joint section is produced from several single elements that are rigidly connected with each other for producing the joint section, for example by firm material bonding such as, for example, welding or by a frictional connection, for example by tight screwing of the single elements with each other. The joint section made of full material can thus be produced from several single elements, each of which is made of full material. The rigid connection of the single elements is preferably designed in such a manner that no relative movement of the elements with respect to one another is possible at the junctions at which the elements are connected with each other so that they are connected with each other in a fixed position at their junctions so that, during the purposeful service of the damping device, a relative movement of the elements with respect to one another at their junctions is possible only by damaging the damping device. Thus, in case of an axial relative movement of the components that are connected with each other by the damping device according to the invention, no axial relative movement of the single elements of the joint section with respect to one another does take place at their junctions as long as the relative movement is correlated with a displacement within the range of axial displacement of the axial damper and thus within the functional damping range of the axial damper. Accordingly, when providing a frictional connection between the elements, a correspondingly strong frictional connection between the elements is thus provided that impedes a relative movement of the elements at their junctions within the functional damping range of the axial damper. The configuration of the joint section as a rigidly interconnected continuous component is particularly advantageous since an axial backlash is then excluded in the joint section so that, when the damping device according to the invention is properly used, on the one hand the damping device immediately reacts in case of an axial relative movement of the components and, on the other hand, a wear of the damping device because of an axial backlash in the joint section is excluded. Moreover, the configuration according to the invention, and in particular the integral one-piece configuration, makes possible an easy production of a wear-resistant bending joint. The whole bending joint is accordingly particularly preferably designed as a continuous rigidly interconnected component so that the aforementioned advantages of the corresponding configuration of the joint section can still be enhanced.

According to the invention, the bending joint can be bent about an axis of rotation in its joint section when an external force impacts the mounting element of the bending joint relative to the connecting element to which the bending joint is fixed with a relative direction of force perpendicularly to the axial direction and perpendicularly to the axis of rotation. Such an external force can arise perpendicularly to the axial direction when the damping device according to the invention is properly used, for example due to a relative movement of the components between which the damping device is mounted. A bending of the joint section can occur with the effect of a corresponding external force that has a component, the direction of which is perpendicular to the axis of rotation and perpendicular to the axial direction. The bending joint is preferably designed in such a manner that, when such an external force arises, it bends exclusively in the joint section. The bending joint is preferably designed in such a manner that it can be bent in the joint section about several axes of rotation, each of them being perpendicular to the axial direction. In this specification, the term "can be bent" always includes "can be resiliently bent". The resilient bendability of the bending joint implies specific advantages. In particular a wear of the bending joint can thus be minimized under varying stresses perpendicularly to the axial direction. Furthermore, the resilient bendability is always accompanied by the fact that the bending joint during bending tends to return to its rest position in which it is not bent. Even a too large deflection of the components connected by the damping device perpendicularly to the axial direction can thus be counteracted.

The bending joint is preferably designed in such a manner that it does not bend in case of a stress due to a force that acts exclusively in the axial direction between the connecting element and the mounting element and uniformly impinges onto the bending joint in the plane perpendicular to the axial direction so that, when the damping device according to the invention is properly used between two components, a relative movement in the axial direction of the components is directly converted into a relative movement of the connecting elements so that the axial damper of the damping device can immediately damp the relative movement. Thus, the damping device is preferably designed in such a manner that the axial damper and the bending joint are matched to one another so that the bending joint remains axially rigid in an axial damping range of the damping device and thus within the functional damping range of the axial damper, i.e. that, when an axial force acts onto the damping device, the axial damper always allows a displacement of the connecting elements within the range of displacement before it comes to a bending of the bending joints.

The bending joint is particularly preferably designed in such a manner that, when a relative force is applied between the mounting element and the connecting element fixed to the bending joint that acts perpendicularly to the axis of rotation and to the axial direction, the bending joint bends exclusively in the joint section. In particular, it can be provided for this purpose that here a bending of the mounting element is excluded. In particular, when a corresponding force is applied, it can be excluded that the axial edge sections of the bending joint that extend respectively over at least 5%, in particular at least 10% of the axial length of the bending joint, bend. A sufficiently rigid fixing of the bending joint to the axial damper and to a component can thus be ensured. Particularly preferably, the length of extension of the joint section is at least 50%, in particular between 50% and 90% of the whole extension of the bending joint in the axial direction. A bendability can thus be particularly easily be ensured. Moreover, the bendability is limited to the joint section. In an embodiment, the bending joint in the damping device can be produced integrally in one piece with the axial damper. In an embodiment that can be realized particularly easily and cost-effectively, the bending joint is designed as an element separate from the axial damper and can be alternately mounted on the connecting element and dismounted. To this end, the bending joint can preferably comprise a fastening section with which it can be fastened to the connecting element. The fastening section can preferably be designed as a rigid section and can be placed in particular at the axial end of the bending joint that faces the mounting element. In an embodiment, the bending joint as such is designed in such a manner that it can be fastened to one of the connecting elements of the axial damper or that it is fastened in a damping device according to the invention, wherein the bending joint furthermore comprises a mounting element for mounting to one of the components, wherein the joint section is placed between the mounting element and the fastening section. Particularly preferably, the joint section comprises a bending element, the bending element, the mounting element and the fastening section being respectively designed as single elements that are rigidly connected with each other in the bending joint according to the invention. For example, the connection can be achieved in that the bending element is fixedly screwed to the mounting element and/or to the fastening section or that it is jammed in a fixed position to the mounting element and/or to the fastening section by a clamping device. A corresponding structure of the bending joint according to the invention can imply the specific advantage that the bending joint can be produced very cost-effectively and can be adapted very easily and cost-effectively to different damping devices according to the invention that are provided for certain purposes since the mounting element and the fastening section can be produced in large numbers and a bending element can be purposefully used for achieving the desired properties of the bending joint, for example by the targeted selection of the material and/or of the material thickness of the bending joint. This being, in an embodiment, the mounting element and/or the fastening section can have a fixing flange that forms a bearing surface that extends in the axial direction and in a transverse direction, the bending element bearing on the bearing surface and a counterpart being provided on the side of the bending element that is turned off the bearing surface, counterpart that is pressed towards the fixing flange against the bending element, in particular by screwing with the fixing flange so that a frictional connection is produced between the bending element and the fixing flange. The counterpart is particularly preferably designed as a pressing section of an angle element, the angle element having a support section extending perpendicularly to the bearing surface away from the pressing section, support section by which it is additionally fixed to the mounting element or the fastening section, in particular is screwed thereto. For a method for producing the bending joint, it is then particularly advantageous that the bending element is pressed, in a first step, by the pressing section to the fixing flange of the mounting element or of the bending section, whereupon the additional fixing via the support section takes place in a second step. This being, the pressing section and the fixing flange are particularly preferably designed in such a manner that they are rounded on their edges that limit their contact surface with the bending element in the axial direction so that, in case of a bending stress of the bending element, an excessive load can be effectively avoided by edges adjacent to the bending element. In an embodiment, the bending element is fixed to the mounting element and/or to the fastening section by a clamping element. For this purpose, for example, the mounting element or the fastening section can have a V-shaped recess, wherein the bending element is inserted into the V-shaped recess and a clamping element is inserted on each side of the bending element into the V-shaped recess, this clamping element being fixed with the mounting element or the fastening section respectively in such a manner that each of the two clamping elements is pressing in the V-shaped recess against the mounting element or the fastening section and the bending element so that a frictional connection is produced between the bending element and the clamping elements and the mounting element or the fastening section in the V-shaped recess. In this embodiment, it is also particularly advantageous that the clamping elements have a rounded edge at their axial end at which they bear on the bending element in order to avoid an excessive material load of the bending element in case of a bending stress so that a long durability of the bending joint can be ensured.

It is obvious to a person skilled in the art that the damping device according to the invention implies substantial advantages compared to conventional damping devices. On the one hand, the bendability of the bending joint about an axis of rotation that is perpendicular to the axial direction ensures that the axial damper of the damping device is not excessively exposed to a force perpendicularly to the axial direction. Damping properties of the axial damper invariably as good as possible are thus ensured and a wear of the axial damper is minimized. The damping device according to the invention is thus notably characterized by its robustness and durability. On the other hand, the bending joint simultaneously ensures a mounting of the axial damper with the least possible backlash onto two components so that the damping device according to the invention can guarantee a damping of axial relative movements between two components as immediately as possible. Moreover, besides the advantageous functional properties of the damping device, the production thereof can be particularly cost-effective, in particular since bending joints can be produced more cost-effectively than joint bearings or ball joints that are used in conventional damping devices. Furthermore, the bending joints can easily be produced maintenance-free, which can imply a low maintenance of the damping device according to the invention.

In an embodiment of the damping device according to the invention, a first bending joint is placed on the first connecting element of the axial damper and a second bending joint on the second connecting element of the axial damper so that the axial damper can be fixed to two components by one bending joint each. In an embodiment, the damping device has only one bending joint that is fixed to one of the connecting elements of the axial damper so that, when the damping device is properly used, one connecting element can be directly mounted to a component and the other connecting element can be mounted to the other component via the bending joint. Particularly preferably, the damping device comprises a bending joint arrangement that allows a fixing of the axial damper to the two components that can be bent about two axes of rotation perpendicular to each other, each of which is perpendicular to the axial direction. This bending joint arrangement can, for example, be ensured by fixing a first bending joint to the first connecting element and a second bending joint to the second connecting element, wherein the first bending joint can be bent in its joint section about a first axis of rotation perpendicularly to the axial direction and the second bending joint can be bent about a second axis of rotation perpendicularly to the axial direction, the axes of rotation being perpendicular to each other. The bending joint arrangement can, for example, be implemented by providing only one bending joint on only one connecting element of the axial damper, wherein this single bending joint can be bent about two axes of rotation mutually perpendicular, each of them perpendicular to the axial direction. Such a bending joint can particularly preferably be provided on both connecting elements. The providing of a corresponding bending joint arrangement is particularly advantageous since all the relative movements perpendicularly to the axial direction that two components perform between which the damping device is mounted in the axial direction can at least partially be taken up by the bending joint arrangement so that the axial damper can be particularly well protected against an excessive stress perpendicularly to the axial direction.

In an embodiment, the joint section of the at least one bending joint has at least one bending section to which exactly one axis of rotation perpendicular to the axial direction is associated, wherein the bending joint is designed in particular in such a manner that, in case of a stress of the mounting element relative to the connecting element with a force perpendicular to the axial direction and perpendicular to the axis of rotation associated to the bending section, a bending of the bending joint takes place exclusively within the axial extension of the bending section. This being, the other axial sections of the bending joint can remain rigid so that they do not bend when the force is applied. For a multi-element configuration of the bending joint, the bending section can comprise the bending element or can be made thereof. The limitation of the bendability to one axial bending section implies the specific advantage that the bending joint can be designed particularly robust outside of the bending section while the bending section ensures the bending functionality of the bending joint. Due to the fact that exactly one axis of rotation is associated to the bending section, the bending section remains rigid in case of a bending stress that is applied by a relative force exerted at its axial ends with a direction of force along its axis of rotation, which implies a particular stability of the bending joint. A bending of the bending sections can arise in particular under the effect of a corresponding external force that has a force component, the direction of which is perpendicular to the axis of rotation associated thereto and perpendicular to the axial direction.

In an embodiment, the joint section has a first bending section and a second bending section that are placed the one behind the other in the axial direction, wherein the bending joint can be bent, in particular resiliently bent, in its first bending section about a first axis of rotation that is perpendicular to the axial direction and in its second bending section about a second axis of rotation that is perpendicular to the axial direction and to the first axis of rotation. The bending joint is particularly preferably designed in such a manner that the first bending section is designed rigid with respect to a relative force exerted along the first axis of rotation at its axial ends, i.e. rigid with respect to a bending stress relating to a bending about the second axis of rotation and/or that the second bending section is designed rigid with respect to a relative force exerted along the second axis of rotation at is axial ends, i.e. rigid with respect to a bending stress relating to a bending about the first axis of rotation. This ensures that, in case a relative force is exerted between the mounting element and the connecting element to which the bending joint is fixed in a direction along the first axis of rotation, a bending of the bending joint does not take place in the first bending section but in the second bending section whereas, in case a relative force is exerted along the second axis of rotation, a bending of the bending joint does not take place in the second bending section but in the first bending section. With this embodiment of the damping device according to the invention, a high stiffness of the bending joint can simultaneously be ensured, which is advantageous for the robustness and the functionality of the damping device for ensuring an axial damping, and forces at the axial ends of the damping device that are oriented perpendicular to the axial direction can be taken up by the bending joint. In an embodiment in which the bending joint comprises several single elements, the first bending section has a first bending element and the second bending section has a second bending element, wherein the bending properties of both bending sections are respectively determined by the bending properties of their respective bending element.

A rigid intermediate section that connects the bending sections with each other is particularly preferably provided in the axial direction between the first bending section and the second bending section. In case a relative force is exerted at the axial ends of the bending joint perpendicularly to the axial direction, due to the rigid configuration of the intermediate section, there does not take place any bending in the intermediate section but only a bending in the bending sections. The providing of an intermediate section between the two bending sections can be particularly advantageous for ensuring a sufficient stiffness of the bending joint. In an embodiment in which the bending joint is made of several elements, it can be for example provided that the bending joint comprises one fastening section, the mounting element, the intermediate section and two bending elements as separate elements, wherein, according to the invention, the elements are rigidly connected with each other at their junctions, i.e. that, as intended, they cannot move to one another at their junctions. For example, a first bending element can be fixed to the mounting element and a second bending element can be fixed to the fastening section, wherein the intermediate section is fixed to both bending elements and connects the two bending elements with each other. The fixing of the bending elements to the intermediate section can take place as explained above in relation with the fastening section or the mounting element; for example, the intermediate section can have, for this purpose, two fixing flanges that are axially offset to each other or two V-shaped recesses that are axially offset to each other, wherein the V-shaped recesses are oriented with the tips of their V-shapes towards one another; for example, the intermediate section has a V-shaped recess and an axially offset fixing flange.

Particularly preferably, the intermediate section has a length of extension in all three dimensions that is at least four times the length of extension of each bending section along the direction perpendicularly to the axial direction and perpendicularly to their respective axis of rotation. The rigid property of the intermediate section can thus be achieved particularly easily in case a force is exerted onto the bending joint at its axial ends perpendicularly to the axial direction. It can thus be ensured that the intermediate section remains always rigid in case of a stress of the bending joint at its axial ends with a relative force perpendicularly to the axial direction whereas a bending of the bending joint takes place in the bending sections, in particular exclusively in the bending sections.

In an embodiment, the at least one bending section is made of only one material, wherein the material in the bending section has a thickness in a direction perpendicular to the axial direction and perpendicular to the axis of rotation associated to the bending section that is less than 5%, in particular less than 3% of the axial length of extension of the bending joint, in particular less than 5% of the length of extension of the bending section. This can then apply accordingly to any bending section. The axis of rotation associated to a bending section is the axis about which the bending section can be bent. The bending property of the bending section can be particularly advantageously adjusted in case of a bending about its associated axis of rotation by the ratio between said thickness of the bending section and the axial length of extension of the bending joint, in particular of the axial length of extension of the bending section. In particular due to the specified ratios, a resilient bendability of the bending section can be made available while simultaneously a material can be used that has such a strength that it is sufficiently rigid at least in the axial direction of the bending sections in order to make available to the damping device particularly good damping properties that come into effect already for the least deflection of the components between which the damping device is mounted.

In an embodiment, the length of extension of the at least one bending section along its associated axis of rotation is at least twice, in particular at least four times bigger than the length of extension of the bending section in a length of extension that is perpendicular to its associated axis of rotation and perpendicular to the axial direction. This being, the indications relate respectively to the minimal length of extension of the bending section in the corresponding direction. With this embodiment, a high stiffness of the bending section can be ensured in case a force acts parallel to its associated axis of rotation which can an overall positive impact on the stiffness of the bending joint and thus on the damping properties and the direct reaction of the damping device. Of course, the above-mentioned advantageous properties of the bending section can be provided for all the bending sections. In an embodiment, the whole bending section of the bending joint, in particular the whole bending joint, is made of only one material. For example, steel can be advantageous as such a material. Here, a steel is preferably provided that has such a high yield strength that a resilient bendability of the bending joint is made available, in particular by ensuring a long durability of the bending joint.

In an embodiment, the joint section, in particular the bending joint, is made of full material, wherein in particular the at least one bending section has a shape in the manner of a plate, the planar extension of which is fixed by the axial direction and by its associated axis of rotation. The whole bending joint is preferably made of full material. In an embodiment, the bending element of the bending section has a shape in the manner of a plate, the planar extension of which is fixed by the axial direction and by its associated axis of rotation. Due to the production of the joint section or of the whole bending joint from full material, a particularly robust configuration of the bending joint can be achieved. Due to the configuration of the bending section or of the bending element with a shape in the manner of a plate, a very good bendability, in particular a very good resilient bendability of the bending section, can be ensured while simultaneously the bending section is rigid with respect to a force acting at its axial ends along its associated axis of rotation which can be particularly advantageous for the stiffness of the bending joint. Here, the shape of a plate is characterized in that the length of extension of the plate in its planar extension is substantially larger than the length of extension of the plate along its plate thickness. For example, the lengths of extension of the planar extension can be respectively at least five times bigger, in particular at least ten times bigger than the plate thickness.

In an embodiment, the bending joint has a first flange with which it is fixed to the first or to the second connecting element as well as a second flange that forms the mounting element of the bending joint. The bending joint can be particularly easily and firmly fixed to a connecting element of the axial damper and to a component so as to be dismountable, wherein the first flange can act as the fastening section of the bending joint. The damping device can thus be produced and mounted between two components particularly easily and cost-effectively. The bending joints can in particular be produced independently from the axial damper, which considerably simplifies the whole production of the damping device and reduces the price thereof. This being, each flange can have in all three dimensions a length of extension that is at least four times bigger than the length of extension of the at least one bending section along the direction perpendicular to the axial direction and perpendicular to its associated axis of rotation. This can apply in particular for all the bending sections. It can thus be ensured that the flange always remains rigid for all the forces impacting onto the bending joint perpendicularly to the axial direction whereas the bending joint bends exclusively in the joint section.

There is no need to say that, for the damping device according to the invention, a bending joint can be provided respectively on each of the two connecting elements of the axial damper, wherein each of the bending joints can have properties that are outlined here in the context of advantageous embodiments of the damping device according to the invention with respect to one bending joint.

In an embodiment, the axial damper is designed as a viscous damper that has a housing and a piston, wherein the piston is placed axially displaceable with respect to the housing within a range of displacement. A viscous medium is provided in the housing. The housing, the piston and the viscous medium are matched and placed to one another so that the piston is as well placed in any position within the range of displacement with a first axial piston section outside the housing and protrudes with the first axial piston section over a first axial end of the housing as is placed with a second axial piston section inside the housing and is immersed in sections in the viscous medium. The piston is thus, in any possible position within the range of displacement, always with a first axial piston section outside the housing, namely axially besides a first axial end of the housing and simultaneously with a second axial piston section inside the housing, wherein it is then always immersed in sections in the viscous medium in the housing. The first connecting element is placed at the first axial end of the piston and the second connecting element is placed at the second axial end of the housing. This being, the piston and the housing form in their interaction the axial damping section of the axial damper. In case of a relative axial displacement of the connecting elements with respect to one another, the immersion depth of the piston in the viscous medium inevitably varies, whereby the viscous medium shears on the piston during the variation of the immersion depth. Hence, a damping of an axial relative movement of the connecting elements to one another is ensured. Depending on the intended application, a medium with different viscous properties can be provided for making available different damping properties. The damping device according to the invention with the axial damper designed as a viscous damper provides a configuration of the damping device that is maintenance-free to a large extent and moreover an immediate reaction of the damping device to a relative movement of two components between which the damping device is mounted since any axial relative movement of the connecting elements to one another is subject to an immediate damping through the interaction of the piston, the housing and the viscous medium.

In an embodiment, the viscous medium is provided as a viscous fluid, wherein the piston has a third axial piston section that is placed in any position of the piston inside the housing within the range of displacement and is situated axially between the first and the second piston section. This being, a guide is provided between the third piston section and the housing. The guide avoids a sliding contact between the piston and the housing. The guide can be designed, for example, as a Teflon element, as a hard tissue element or as a brass element, for example shaped as a strip. The viscous fluid is placed axially only on the side of the third piston section on which the second piston section is situated. The guide can be designed in such a manner that there is a leakage between the guide and the third piston section and/or between the guide and the housing by which viscous fluid can come between the guide and the third piston section and/or between the guide and the housing so that in particular a lubrication can be ensured between the guide and the piston and/or between the guide and the housing. In an embodiment, a gasket is provided axially in direction of the first piston section besides the guide, this gasket being placed inside the housing and on the piston and designed in such a manner that the exit of viscous fluid out of the housing is prevented. In an embodiment, the viscous medium is designed as a viscoelastic medium, wherein the viscoelastic medium fills the whole volume in a working chamber of the housing, in particular in the housing that is not filled by the piston. The housing can comprise the working chamber and in particular can consist of the working chamber. The piston is consequently fully surrounded by the viscoelastic medium inside the working chamber of the housing. It is thus ensured that the axial damper immediately reacts to axial relative movements of the connecting elements and immediately damps such relative movements. The piston and the housing are particularly preferably designed corresponding to each other so that the volume of the piston that is situated inside the working chamber of the housing is the same in any position of the piston within the range of displacement. This can take place, for example, in that the piston has a cylindrical section, the cylinder axis of which extends in the axial direction and extends in any position of the piston within the range of displacement always fully axially through the working chamber of the housing.

Furthermore, the invention relates to a system comprising at least two damping devices according to the invention, wherein the axial direction of a first damping device forms an angle of at least 30°, in particular of 60° to 120° with the axial direction of a second damping device. A corresponding system according to the invention ensures a particularly robust mutual support of two components that are connected with each other via the system by making available a very good damping of the relative movement. The system according to the invention can particularly preferably be used in such a manner that the first damping device connects a first component axially with a second component and the second damping device connects the first component axially with a third component. With respect to the definition of the "axial direction", it should be noted that the axial direction is always set for a concrete damping device according to the invention. For example, a system according to the invention can be used for the damped support of a first component on a second component or for the damped support of a first component with respect to a second component and to a third component, both axial dampers being mounted with their axial directions between the first and the second component and/or between the first, the second and the third component.

Furthermore, the invention relates to the use of a bending joint for mounting an axial damper that is designed for damping relative movements of two components to one another in the axial direction, on one of the components. The bending joint has a fastening section, a mounting element spaced from the fastening section in the axial direction and a joint section that connects the fastening section with the mounting element and that is designed as a continuous rigidly interconnected component. The joint section can be resiliently bent about at least one axis of rotation perpendicularly to the axial direction. The joint section of the bending section has at least one axial bending section that is associated to exactly one axis of rotation perpendicularly to the axial direction and that remains rigid with respect to a bending stress that is exerted on itself by a relative force applied at its axial ends with a direction of force along its axis of rotation, wherein the bending section has a shape in the manner of a plate, the planar extension of which is fixed by the axial direction and by the axis of rotation associated thereto, wherein the bending section has a length of extension in a direction perpendicular to the axial direction and perpendicular to the axis of rotation associated to the bending section that is less than 5% of the axial length of extension of the bending section and wherein the bending section has a length of extension along its associated axis of rotation that is at least four times bigger than the length of extension of the bending section in the direction that is perpendicular to its associated axis of rotation and perpendicular to the axial direction, wherein the joint section of the bending joint is made from full material. For the use according to the invention, the component is fixed with its fastening section to the axial damper and with its mounting element to the component. The axial damper preferably has two connecting elements axially spaced from each other as well as a damping section placed axially between the connecting elements, wherein the first connecting element is connected to the second connecting element by the damping section by ensuring a damped axial relative movement between the two connecting elements, wherein the bending joint is fixed with its fastening section to the first connecting element of the axial damper and with its mounting element to the first component and wherein the second connecting element of the axial damper is fixed to the second component, wherein in particular a second bending joint is provided between the second connecting element and the second component, this second bending joint being fixed with its fastening section to the second connecting element of the axial damper and with its mounting element to the second component. The use according to the invention of the bending joint can have further characteristics and imply advantages that are obvious from the above description of a damping device according to the invention.

Furthermore, the invention relates to a bending joint for the use in a damping device according to the invention. The bending joint has a fastening section with which it can be mounted to one of the two connecting elements of the axial damper as well as a mounting element with which it can be mounted on one of the two components. The bending joint has a joint section that is configured as a continuous rigidly interconnected component and that extends axially between the fastening section and the mounting element, wherein the bending joint can be resiliently bent in its joint section about at least one axis of rotation that is perpendicular to the axial direction. The joint section has an axial bending section that is associated to exactly one axis of rotation perpendicularly to the axial direction and that remains rigid with respect to a bending stress that is exerted on itself by a relative force applied at its axial ends with a direction of force along its axis of rotation, wherein the bending section has a shape in the manner of a plate, the planar extension of which is fixed by the axial direction and by the axis of rotation associated thereto, wherein the bending section has a length of extension in a direction perpendicular to the axial direction and perpendicular to the axis of rotation associated to the bending section that is less than 5% of the axial length of extension of the bending section and wherein the bending section has a length of extension along its associated axis of rotation that is at least four times bigger than the length of extension of the bending section in the direction that is perpendicular to its associated axis of rotation and perpendicular to the axial direction, wherein the joint section of the bending joint (1) is made from full material.

The bending joint can have further characteristics and advantages that are respectively obvious from the above description of a damping device according to the invention.

Furthermore, the invention relates to a method for mounting an axial damper between two components that is designed for damping relative movements in an axial direction between the two components, wherein an axial end of a bending joint, that can be resiliently bent about at least one axis of rotation that is perpendicular to the axial direction, is fastened to an axial end of the axial damper, wherein the joint section has at least one axial bending section that is associated to exactly one axis of rotation perpendicularly to the axial direction and that remains rigid with respect to a bending stress that is exerted on itself by a relative force applied at its axial ends with a direction of force along its axis of rotation, wherein the bending section has a shape in the manner of a plate, the planar extension of which is fixed by the axial direction and by the axis of rotation associated thereto, wherein the bending section has a length of extension in a direction perpendicular to the axial direction and perpendicular to the axis of rotation associated to the bending section that is less than 5% of the axial length of extension of the bending section and wherein the bending section has a length of extension along its associated axis of rotation that is at least four times bigger than the length of extension of the bending section in the direction that is perpendicular to its associated axis of rotation and perpendicular to the axial direction, wherein the joint section of the bending joint is made from full material, wherein the other axial end of the bending joint is fastened to one of the components. Particularly preferably, an axial end of a second bending joint that can be bent, in particular resiliently bent, about at least one axis of rotation that is perpendicular to the axial direction is fastened to the opposite axial end of the axial damper, wherein the other axial end of the second bending joint is fastened to the other component. The method implies advantages and can have further characteristics that are obvious from the above description of a damping device according to the invention.

BRIEF DESCRIPTION OF THE DRAWINGS

The invention will be explained in detail below on the basis of different embodiments with reference to the figures.

DETAILED DESCRIPTION

Figure 1A:
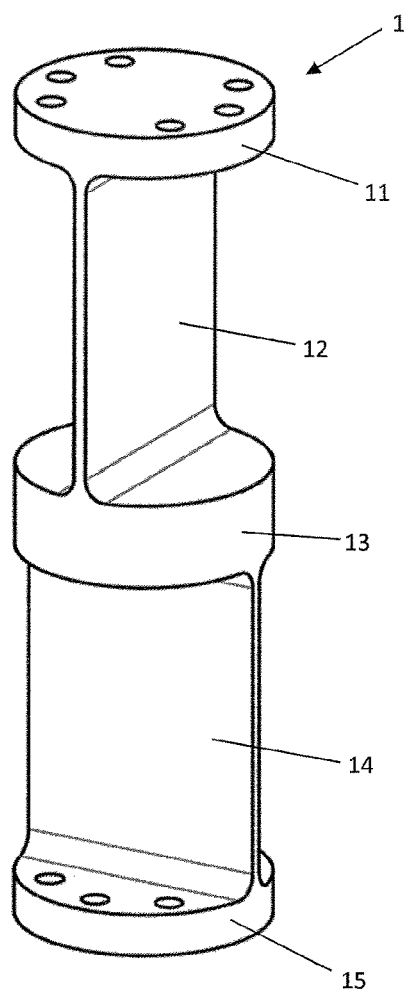
FIGS. 1A, 1B and 1C show schematic diagrams of an embodiment of a bending joint according to the invention.
Figure 1B:
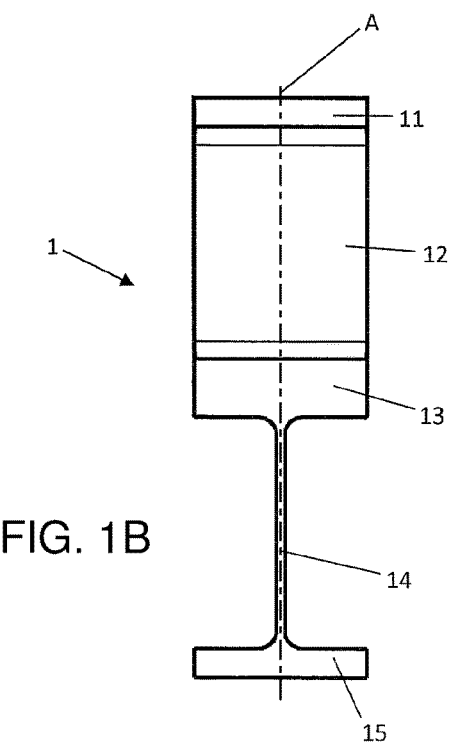
Figure 1C:
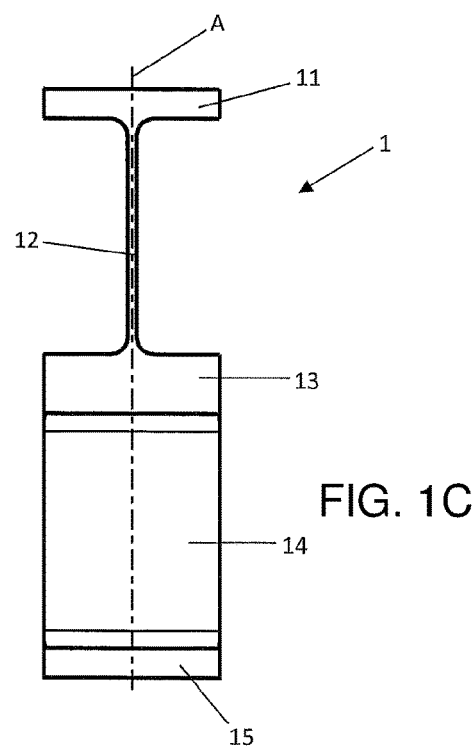

An embodiment of a bending joint 1 according to the invention is represented in FIG. 1 that comprises the FIGS. 1a, 1b and 1c. A top view diagonally to the axial direction A is represented in FIG. 1a; a top view from a first direction perpendicularly to the axial direction A is represented in FIG. 1b; a top view from a second direction perpendicularly to the axial direction 1 that is also perpendicular to the first direction is represented in FIG. 1c.

As may be seen in FIG. 1, the represented embodiment of the bending joint according to the invention 1 has a mounting element 11 and a fastening section 15 spaced from the mounting element 11 in the axial direction A, wherein the mounting element 11 and the fastening section 15 are connected with each other by a joint section and are designed here identical as flanges. The joint section comprises a first bending section 12, an intermediate section 13 and a second bending section 14, wherein the bending sections 12, 14 are placed axially the one behind the other and wherein the intermediate section 13 is provided axially between the first bending section 12 and the second bending section 14 and connects the bending sections 12 and 14 with each other. The bending joint 1 according to FIG. 1 is designed integrally in one piece.

The bending joint can be bent in the first bending section 12 about a first axis of rotation perpendicularly to the axial direction A and in the second bending section 14 about a second axis of rotation perpendicularly to the axial direction A, wherein both axes of rotation are perpendicular to each other. The axis of rotation associated to the first bending section 12 extends perpendicularly to the drawing level according to FIG. 1c; the second axis of rotation associated to the second bending section 14 extends perpendicularly to the drawing level according to FIG. 1b. Both bending sections 12, 14 have respectively a shape in the manner of a plate, the thickness of which is respectively substantially lower than the lengths of extension of their planar extension. This being, both plate shapes of both bending sections 12, 14 are twisted to each other by 90°. The whole represented bending joint 1 is made from only one material so that the production can be carried out particularly cost-effectively and the bending joint 1 can be particularly robust. A steel is used that has a sufficiently high yield strength and strength so that a fatigue-free resilient bendability of the bending joint 1 is ensured in the bending sections 1,2 14.

The represented bending joint 1 is designed in such a manner that, in case a relative force acts between the mounting element 11 and the fastening section 15 perpendicularly to the axial direction A, a bending of the bending joint 1 takes place exclusively in the bending sections 12, 14 while the mounting element 11, the intermediate section 13 and the fastening section 15 remain rigid. This is carried out here in that the length of extension of the bending sections 12, 14 perpendicularly to the axial direction A and to the axis of rotation that is associated to them, i.e. the thickness of the platform of the bending sections 12, 14, is respectively considerably lower than the length of extension in the same direction of the mounting element 11, of the intermediate section 13 and of the fastening section 15. While for both bending sections 12, 14 the big ratio between the axial length of extension of each bending section 12, 14 and the thickness of each bending section 12, 14 ensures the resilient bendability of the bending section 12, 14 about its associated axis of rotation, said great length of extension of the mounting element 11, of the intermediate section 13 and of the fastening section 15 simultaneously ensures the rigid behavior of these components of the bending joint 1 during a bending of the bending sections 12, 14. Moreover, the fact that the length of extension of the mounting element 11, of the intermediate section 13 and of the fastening section 15 in the axial direction A is respectively at least three times bigger than the thickness of each of the bending sections 12, 14 contributes to their remaining rigid.

Moreover, a special feature of the bending joint 1 according to FIG. 1 consists in that the each of the bending sections 12, 14 is designed in such a manner that its length of extension perpendicularly to its associated axis of rotation and perpendicularly to the axial direction A is substantially lower than its length of extension along its associated axis of rotation. Correspondingly, the described bending joint 1 is characterized in that, in case of a relative force acting onto the mounting element 11 and the fastening section 15 perpendicularly to the axial direction A and perpendicularly to the first axis of rotation, a bending takes place exclusively in the first bending section 12 while the second bending section 14 remains rigid. In case of a relative force acting perpendicularly to the second axis of rotation and perpendicularly to the axial direction A, the bending of the bending joint 1 takes place exclusively in the second bending section 14 and not in the first bending section 12. The first bending section 12 remains thus rigid in case of a relative force acting onto the bending joint 1 on the mounting element 11 and the fastening section 15 along the first axis of rotation and the second bending section 14 remains rigid in case of a relative force acting between the mounting element 11 and the fastening section 15 along the second axis of rotation. Moreover, the represented bending joint 1 cannot resiliently bend in case of a stress due to a relative force between the mounting element 11 and the fastening section 15 parallel to the axial direction A. Thus, the represented bending joint 1 has the advantage, when used in a damping device according to the invention 100, that it can take up forces from any direction perpendicularly to the axial direction A by being resiliently bent, whereas it remains rigid in case of an axial stress so that, when it is used in a damping device according to the invention 100, it makes possible the direct coupling of an axial damper in the axial direction A to components and simultaneously it impedes an excessive stress of the axial damper by a force perpendicularly to the axial direction A at least to a great extent.

Figure 2A:
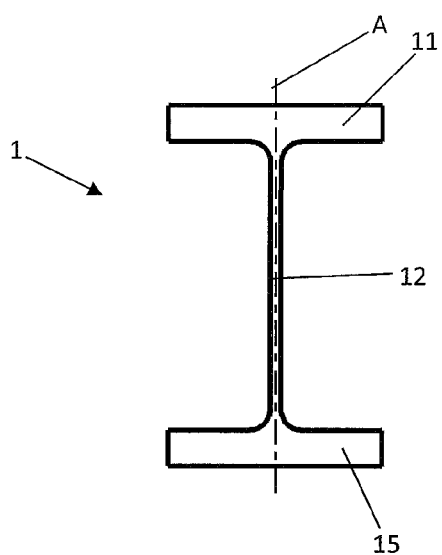
FIGS. 2A and 2B show schematic diagrams of a further embodiment of a bending joint according to the invention.
Figure 2B:
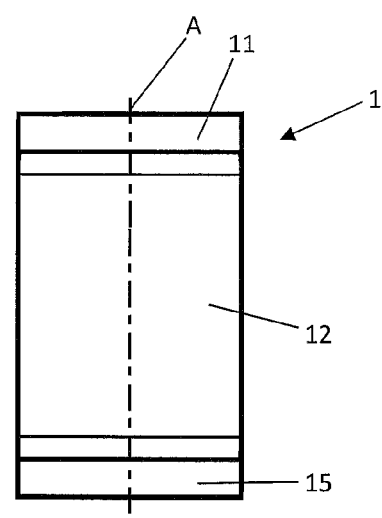

A further embodiment of a bending joint according to the invention 1 is represented in FIG. 2 that comprises the FIGS. 2a and 2b. A top view from a first direction perpendicularly to the axial direction A is represented in FIG. 2a; a top view from a second direction that is perpendicular to the axial direction A and to the first direction is represented in FIG. 2b. The bending joint 1 according to FIG. 2 differs from the bending joint 1 according to FIG. 1 in that it has only one bending section 12 that connects the mounting element 11 and the fastening section 15 of the bending joint 1 with each other. Consequently, the bending joint 1 according to FIG. 2 has no intermediate section 13. The bending section 12 rather only forms the bending section of the bending joint 1 according to FIG. 2. As explained with respect to FIG. 1, because of the geometric design of the bending section 12, the bending joint 1 can only bend in the bending section 12 when the mounting element 11 and the fastening section 15 are acted upon by a relative force to one another perpendicularly to the axis of rotation associated to the bending section 12. Just as the bending joint 1 according to FIG. 1, the bending joint 1 according to FIG. 2 is made of only one material, namely steel, and the geometric design of the mounting element 11, of the bending section 12 and of the fastening section 15 corresponds to the geometric design of the corresponding components of the bending joint 1 according to FIG. 1. However, while the bending joint 1 according to FIG. 1 can bend about two axes of rotation perpendicular to one another, each of which is perpendicular to the axial direction A, the bending joint 1 according to FIG. 2 can bend about only one axis of rotation perpendicularly to the axial direction A. The bending joint 1 according to FIG. 2 can be produced still more cost-effectively than the bending joint 1 according to FIG. 1 and can advantageously be implemented in a damping device according to the invention 100. For example, the bending joint 1 according to FIG. 2 can be used in such mounting situations in a damping device according to the invention 100 for which the components that are axially connected by the damping device 100, due to their construction, can perform only a relative movement in one single direction perpendicularly to the axial direction A. For example, the bending joint 1 according to FIG. 2 can be used in a damping device 100 so that a bending joint 1 is placed on each connecting element of the axial damper, wherein the bending joints 1 are twisted in their orientation to one another by 90° about the axial direction A so that such a damping device 100 has also a bending joint arrangement for which any force perpendicularly to the axial direction A implies a bending of the bending joint arrangement so that an excessive stress of the axial damper by a relative force between two components between which the damping device 100 is clamped, can at least partially be avoided.

Figure 3:
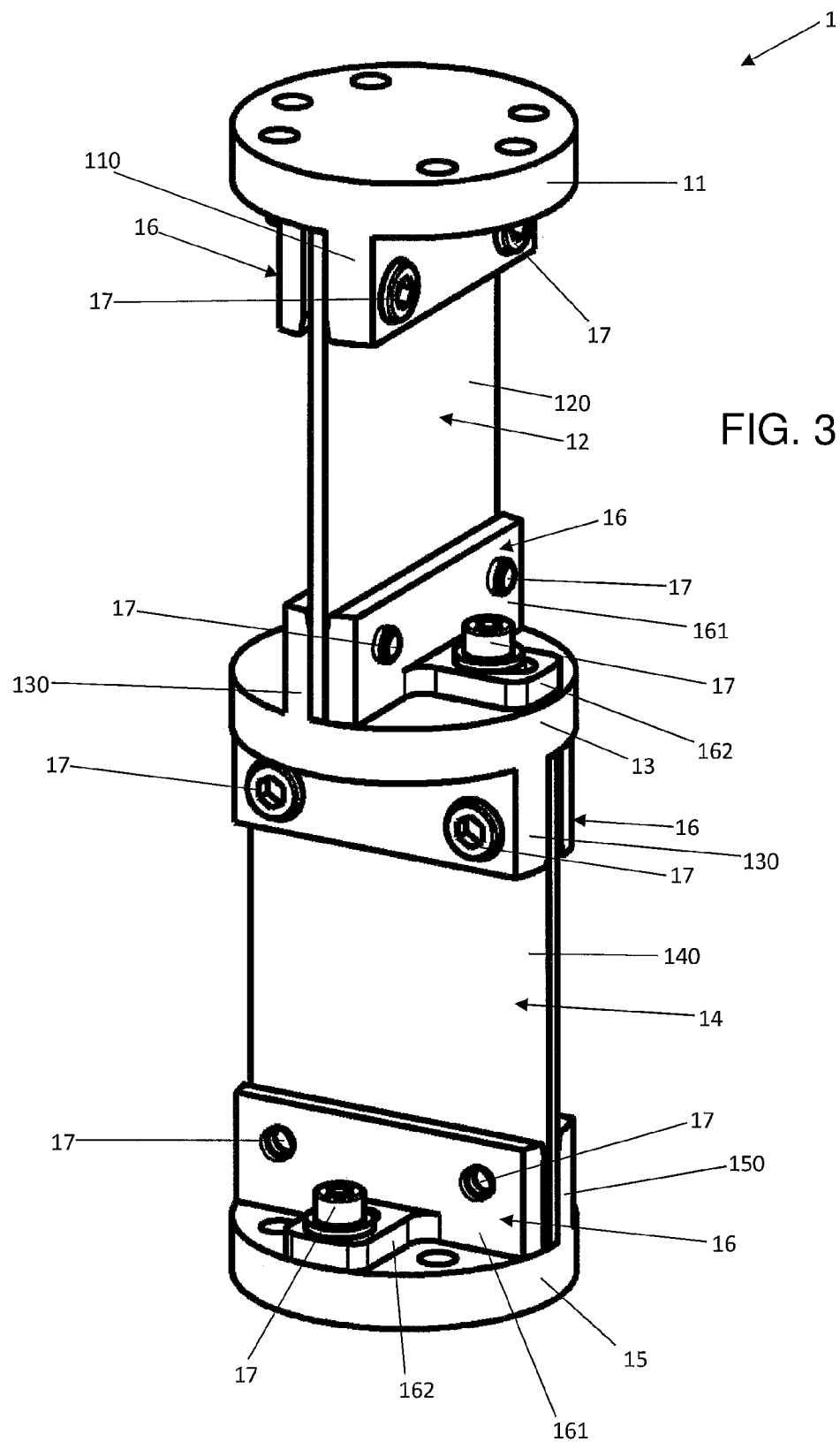
FIG. 3 shows a schematic diagram of a further embodiment of a bending joint according to the invention.

A further embodiment of a bending joint according to the invention 1 is represented in FIG. 3 in a schematic diagram. The embodiment represented in FIG. 3, as well as the embodiment represented in FIG. 1, comprises two bending sections 12, 14 between which an intermediate section is placed in the axial direction. The embodiment according to FIG. 3 differs from the embodiment according to FIG. 1 basically in that it is not designed like the embodiment according to FIG. 1 as an integral one-piece component but that it is made of several single elements that are rigidly connected with each other.

The embodiment according to FIG. 3 has a mounting element 11 that has a fixing flange 110. The fixing flange 110 has a bearing surface on which a first bending element 120 that is surrounded by the first bending section 12 is placed. The first bending element 120 is pressed against the bearing surface of the fixing flange 110 by an angle element 16. To this end, the fixing flange 110 has two bushings through which screws 17 are stuck, whereas the angle element 16 has a pressing section 161 that is designed as a counterplate and that has two threaded holes into which the screws 17 are screwed so that the pressing section 161 is pressed by the screws 17 against the first bending element 120 towards the fixing flange 110. The screw connection thus produces a frictional connection between the first bending element 120 and the mounting element 11. Furthermore, the angle element 16 has a support section 162 that extends away from the pressing section 161 perpendicularly to the bearing surface. The support section 162 has a recess through which a further screw 17 is stuck that is screwed in a threaded hole that is provided in the mounting element 11 so that the support section 162 is pressed against the mounting element 11. This ensures an additional support of the angle element 16 on the mounting element 11, which still improves the durability of the embodiment according to FIG. 3.

The fixing of the first bending element 120 takes place correspondingly on the intermediate section 13 for which the intermediate section 13 has a corresponding fixing flange 130. Furthermore, the intermediate section 13 has a further fixing flange 130 that is spaced axially from the first fixing flange 130 and that is placed twisted thereto by 90°. The second bending element 140 of the described embodiment that is surrounded by the second bending section 14 is fixed to the second fixing flange 130 in the way that has been described. The second bending element 140 again is fixed to the fixing flange 150 of the fastening section 15 in the way that has been described. Here, the mounting element 11 and the fastening section 15 are designed identical. It results from the described embodiment that the bending joint 1 is designed as a continuous rigidly interconnected component since it is ensured by the frictional rigid connection between the mounting element 120 and the intermediate section 13, the intermediate section 13 and the second bending element 140 and the second bending element 140 and the fastening section 15 that the bending joint 1, when used in a damping device according to the invention, has no axial backlash in itself, which implies the particularly advantageous properties of the bending joint 1 and of the damping device according to the invention that have been described. It can be seen in FIG. 3 that all the fixing flanges 110, 130, 150 and the angle elements 120, 140 have rounded edges at the axial ends with which they bear on the bending elements 120, 140 so that, even in case of a long lasting, often varying stress of the bending joint 1, there does not take place any excessive strain of the bending elements 120, 140 by the edges of the fixing flanges 110, 130, 150 and of the angle elements 16.

Figure 4A:
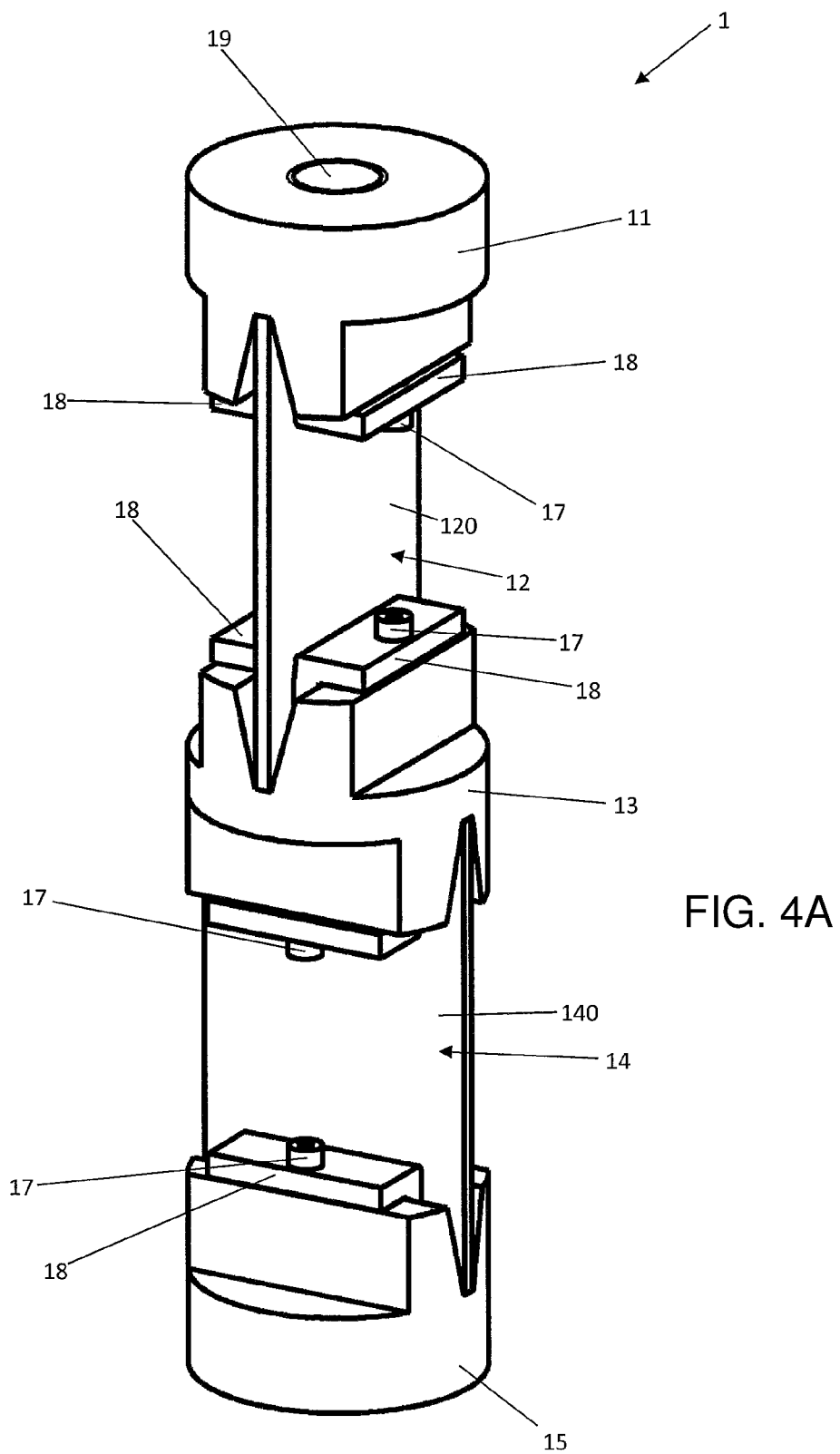
FIGS. 4A and 4B show schematic diagrams of a further embodiment of a bending joint according to the invention.
Figure 4B:
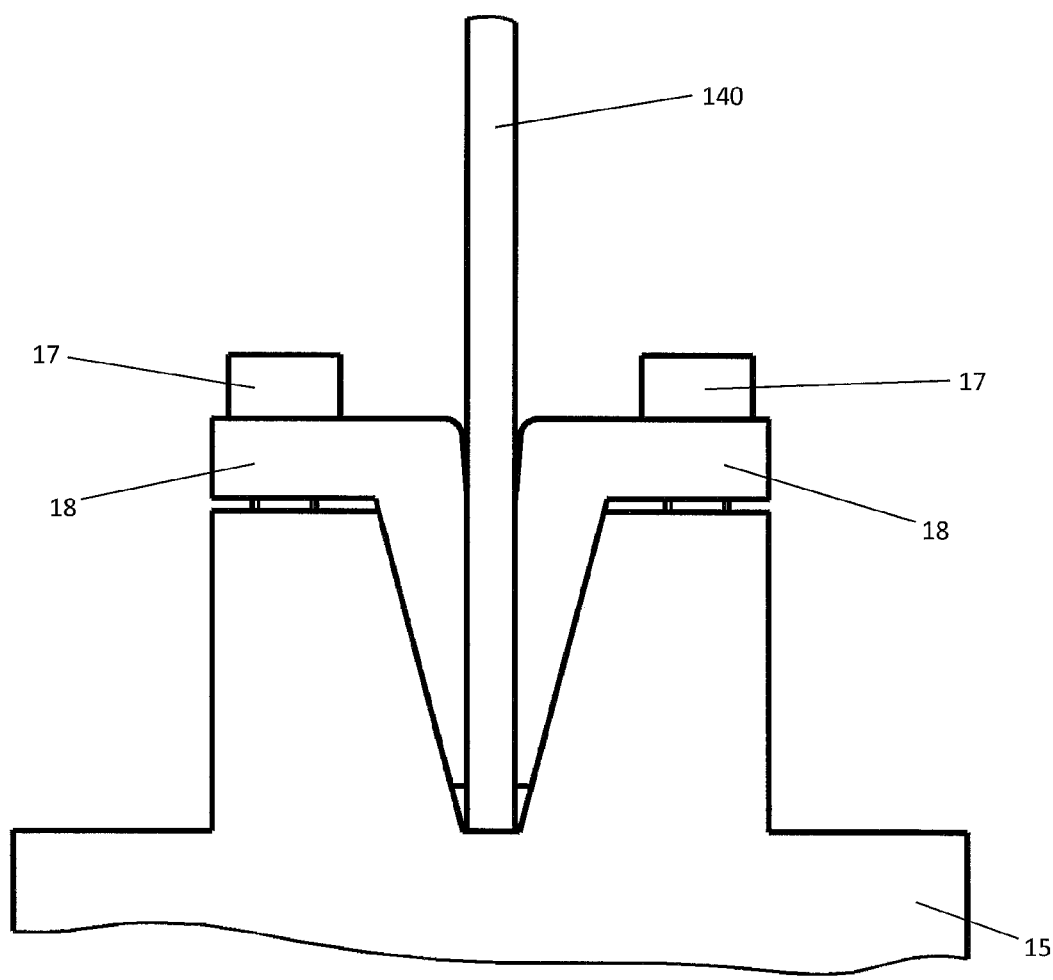

A further embodiment of a bending joint according to the invention 1 is represented in FIG. 4 as a schematic diagram that comprises FIGS. 4a and 4b. To illustrate the realization of the rigid connection between the single elements of the bending joint 1, the transition between the fastening section 15 and the second bending element 140 is enlarged in FIG. 4b.

The embodiment according to FIG. 4 corresponds in large parts to the embodiment according to FIG. 3 and differs only therefrom in that the rigid connection between the single elements is designed differently which results in correspondingly different designs of the mounting element 11, of the intermediate section 13 and of the fastening section 15 as well as in providing other fastening devices. For the embodiment according to FIG. 4, the mounting element 11 and the fastening section 15 that have an identical design here have respectively a V-shaped recess, whereas the intermediate section 13 has two V-shaped recesses that extend twisted about the axial direction A by 90° and that are turned to each other with the tips of their V-shape. The first bending element 120 is placed in the V-shaped recess of the mounting element 11 and in a first V-shaped recess of the intermediate section 13 and is jammed with the mounting element 11 and the intermediate section 13 by clamping elements 18 that are placed respectively on both sides of the bending element 120 in the respective V-shaped recess. Accordingly, the second bending element 140 is placed in the second V-shaped recess of the intermediate section 13 and in the V-shaped recess of the fastening section 15 and jammed with the intermediate section 13 and the fastening section 15 by corresponding clamping elements 18. The implementation of the jamming of the bending elements 120, 140 in the mounting element 11, in the intermediate section 13 and in the fastening section 15 is illustrated in FIG. 4b. The clamping elements 18 are designed respectively as angles, one leg of which is wedge-shaped and is placed in the V-shaped recess besides the second bending element 140. Each of the clamping elements 18 is screwed with the fastening section 15 via the second leg of the angle, wherein the fastening section has a threaded hole for this purpose. The clamping elements 18 are inserted with effort into the V-shaped recess besides the second bending element 140, in particular are pressed or beaten so that they generate a pressing pressure onto the second bending element 140. After insertion, the position of the clamping elements 18 is secured in the V-shaped recess by the screws 17. With their wedge-shaped legs, the clamping elements 18 thus bear on the fastening section 15 as well as on the second bending element 140 so that a frictional connection is produced between the second bending element 140 and each of the two clamping elements 18 as well as a frictional connection between each of the clamping elements 18 and the fastening section 15 inside the V-shaped recess. The second bending element 140 is connected to the clamping elements 18 and the fastening section 15 via this frictional connection, the intensity of which can be adjusted by the effort during the insertion of the clamping elements 18 in such a manner that, when the bending joint according to the invention 1 is properly used in a damping device according to the invention that is mounted between two components, there does not arise any relative movement of the single elements of the bending joint 1 when both components carry out relative movements. As explained with respect to FIG. 3, the clamping elements 18 also have a rounded edge at their axial end turned away from the fastening section 15 with which they bear on the second bending element 140 so that an excessive stress of the bending element 140 is effectively avoided.

As a person skilled in the art will recognize in the FIGS. 1 to 4, the mounting element 11 and the fastening section 15 of the represented embodiments are respectively designed in such a manner that they can be simply fastened to a component or to an axial damper. To this end, the mounting element 11 and the fastening section 15 of the embodiments according to the FIGS. 1 to 3 have a fastening section each that is placed respectively perpendicularly to the axial direction A offset to the bending section 12, 14 respectively placed on the mounting element 11 or on the fastening section 15. Bushings through which the screws can be guided for fixing the mounting element 11 to a component or of the fastening section 14 to an axial damper are provided in the fastening section. On the other hand, the mounting element 11 and the fastening section 15 of the embodiment according to FIG. 4 have a connection bore 19 that is designed as a threaded hole. The bending joint 1 can be simply fixed to a component or to the axial damper via the connection bore 19 that is located along the axial direction and that is placed centrally on the bending joint 1 perpendicularly to the axial direction, for example by screwing onto a threaded bolt placed on the component or on the axial damper. The providing of the connection bore 19 makes possible a particularly space-saving design of the bending joint 1. The designs of the described bending joints 1 with reference to the easy fixability of the bending joint can generally speaking be advantageous for a bending joint according to the invention.

Figure 5:
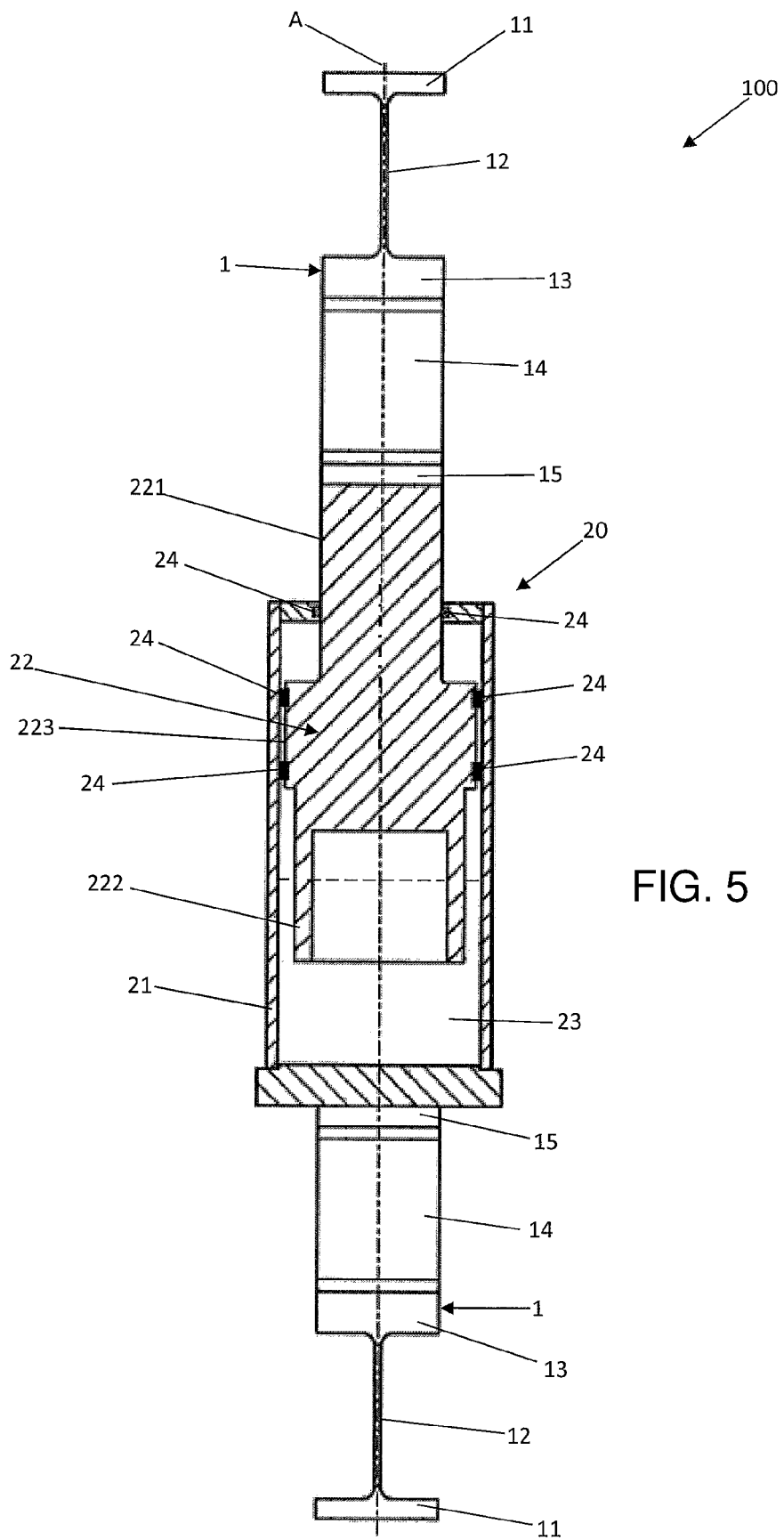
FIG. 5 shows a schematic diagram of an embodiment of a damping device according to the invention.

An embodiment of a damping device according to the invention 100, the axial damper 20 of which is designed as a viscous damper, is represented in FIG. 5. The axial damper 20 comprises a housing 21 as well as a piston 22 that is placed displaceable axially to the housing 21 within a range of displacement. The piston 22 has a first piston section 221 that is placed in any position of the piston 22 within the range of displacement outside the housing 21 as well as a second piston section 222 that is immersed in a viscous fluid 23, that is provided in the housing 21, in any position of the piston 22 within the range of displacement. For the damping device 100 represented in FIG. 5, the viscous fluid 23 is placed in the housing 21 up to the dashed filling level. Furthermore, the piston 22 has a third piston section 223 that is placed axially between the first piston section 221 and the second piston section 222. A guide, that comprises three guide bands 24 in such a manner that the piston 22 can be reliably moved with respect to the housing 22 without sliding contact, guides the piston 22. Here, two of the guiding bands 24 are provided between the third piston section 223 and the housing 22. In this very case, the housing 21 is designed as a hollow cylinder, the cylinder axis of which extends in the axial direction A, while the piston 22 is configured in its third piston section 223 as a full cylinder, the axis of which also extends along the axial direction A and the diameter of which is only slightly smaller than the diameter of the hollow cylinder of the housing 21. The piston 22 forms the first connecting element at its first axial end at which the first piston section 221 is placed. The first connecting element is consequently always placed in any position of the piston 22 relative to the housing 21 outside the housing 21 and axially spaced from the first axial end of the housing. The housing 21 forms the second connecting element at its second axial end that is axially opposite to its first axial end and to the first connecting element. A first bending joint 1 is fastened to the first connecting element, a second bending joint 1 to the second connecting element. The bending joints 1 that are used are designed respectively identical and configured according to the embodiment of the bending joint according to the invention 1 represented in FIG. 1.

In FIG. 5, a skilled person can clearly see the operating principle of the damping device according to the invention 100. Because of the rigid axial behavior of the bending joints 1 that are placed on the first and on the second connecting element of the axial damper 20, any relative force stress along the axial direction A between the mounting elements 11 of the two bending joints 1 is directly converted into a relative axial force between the piston 22 and the housing 21 so that the piston 22 moves axially relative to the housing 21. Since the piston 22 is always immersed into the viscous fluid 23 with its second piston section 222, a damping of the axial relative movement between the mounting elements 11 of the bending joints 1 takes place because of the surface wetting of the piston 22 in its second piston section 222 by the viscous fluid 23 due to the shearing of the viscous fluid 23 in case of an axial displacement of the piston 22 relative to the housing 21. On the other hand, a relative force acting between the mounting elements 11 of the two bending joints 1 perpendicularly to the axial direction A is converted into a bending of the bending joints 1 in at least respectively one of their bending sections 12, 14 so that the axial damper 20 is not stressed on its connecting elements by an excessively high force perpendicularly to the axial direction A.

Figure 6:
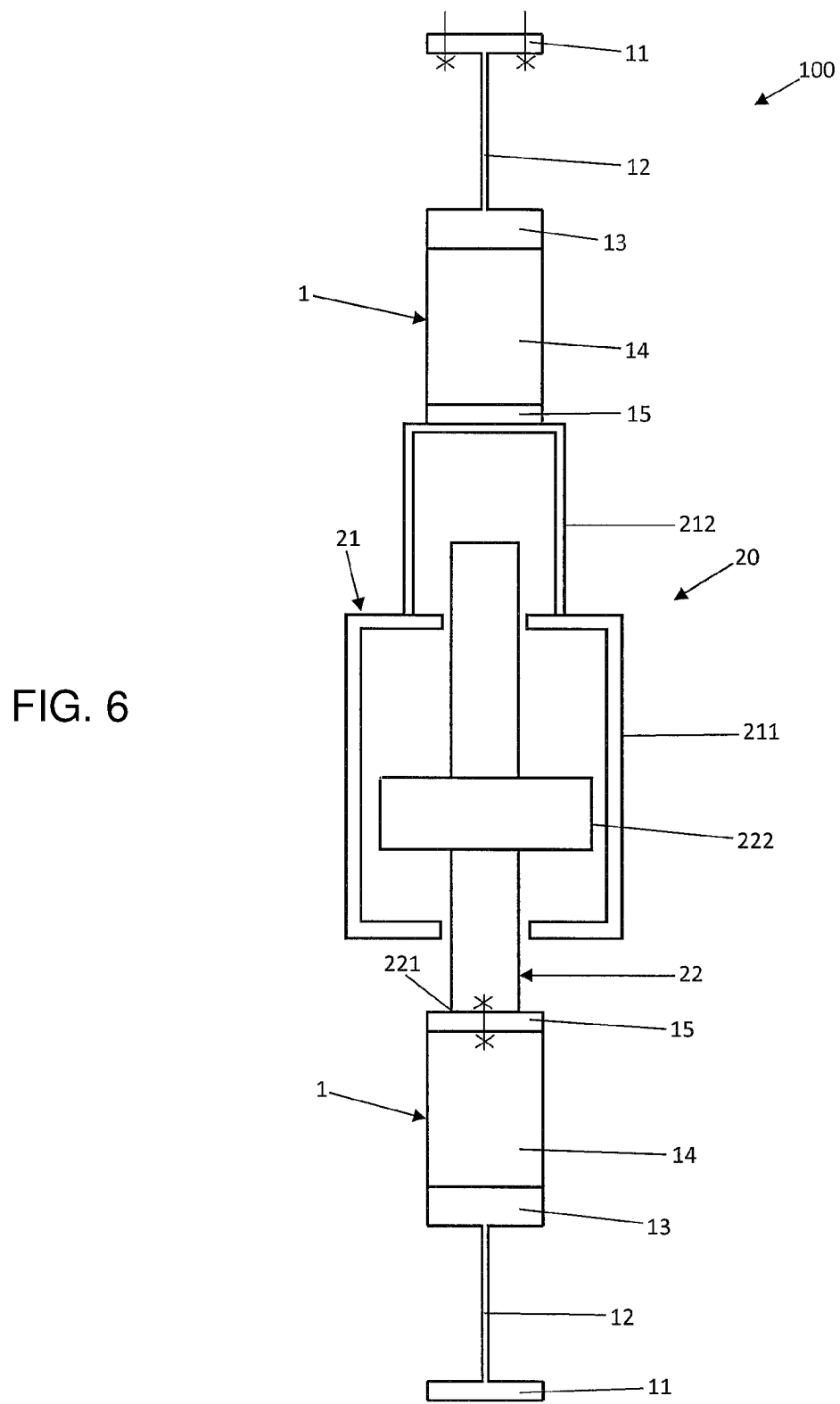
FIG. 6 shows a schematic diagram of a further embodiment of a damping device according to the invention.

A further embodiment of a damping device according to the invention 100 is represented in FIG. 6. In this embodiment—similarly to the embodiment according to FIG. 5—a piston 22 is placed axially movable to a housing 21 within a range of displacement. The housing comprises a working chamber 211 and a receiving chamber 212. For the embodiment according to FIG. 6, a viscoelastic medium 25 is placed in the working chamber 211 of the housing 21 in such a manner that it fills the whole volume in the working chamber 211 that is not occupied by the piston 22. Thus, the viscoelastic medium 25 constitutes a viscous medium of the axial damper 20 of the damping device 100 in which the piston 22 is placed with its second piston section 222 in any of its possible positions. On the other hand, the first piston section 222 is always placed outside the housing 21 in any possible position of the piston 22 relative to the housing 21. For the sake of simplicity, gaskets and guide bands for the sealing guiding of the piston 22 to the housing 21, the design and placement of which are known to a person skilled in the art, are not represented in FIG. 6.

It can be seen in FIG. 6 that—as already explained with respect to FIG. 5—the piston 22 forms a first connecting element, to which a first bending joint 1 is fixed, at its first axial end on its first piston section 221, while the housing forms the second connecting element at its second axial end that is opposite the first axial end of the housing 21 on which the first connecting element is placed. The second connecting element is placed here on the receiving chamber 212 of the housing 21 that is placed axially besides the working chamber 211 and that is designed for receiving the piston section that projects beyond the second axial end of the working chamber 211. The first axial end of the working chamber 211 thus forms the first axial end of the housing 21 and the second axial end of the receiving chamber 212 forms the second end of the housing 21. The second axial end of the working chamber 211 bears on the first axial end of the receiving chamber 212. A bending joint 1 is also connected to the second connecting element.

The damping device 100 according to FIG. 6 thus has the same advantageous properties according to the invention with respect to the axial damping and the load-bearing capacity of the damping device 100 with respect to a force perpendicular to the axial direction, as described for the damping device according to FIG. 5. However, the damping devices 100 of FIG. 5 and FIG. 6 differ by the operating principle of their axial damper 20. Depending on the expected axial displacement path, on the axial displacement frequency and the axial displacement force that is expected for a given use of a damping device according to the invention 100, a damping device according to the invention 100 can be used with a correspondingly advantageously designed axial damper 20. As may be seen by a person skilled in the art, the embodiments of the damping device 100 represented in the FIGS. 5 and 6 are obviously designed in such a manner that they comprise only one bending joint 1 each. Furthermore, these embodiments can obviously have at least one bending joint 1 that has the advantageous characteristics of a bending joint according to the invention 1 that have been described, whereby they can in particular have at least one bending joint 1 according to one of the FIGS. 1 to 4.

LIST OF REFERENCE NUMERALS

1 Bending joint
11 Mounting element
12 First bending section
13 Intermediate section
14 Second bending section
15 Fastening section
16 Angle element
17 Screw
18 Clamping element
19 Connecting bore
20 Axial damper
21 Housing
22 Piston
23 Viscous fluid
24 Guide band
25 Viscoelastic medium
100 Damping device
110 Fixing flange
120 First bending element
130 Fixing flange
140 Second bending element
150 Fixing flange
161 Pressing section
162 Support section
211 Working chamber
212 Receiving chamber
221 First piston section
222 Second piston section
223 Third piston section
A Axial direction

What is claimed is:

1. A damping device for mounting between two separate components for damping oscillations between the components, the damping device comprising:
   an axial damper that comprising two connecting elements, which provide a first connecting element and a second connecting element, wherein the first connecting element is connected to the second connecting element by a damping section by ensuring an axial relative movement of the two connecting elements with respect to one another, wherein the damping section is configured to damp the axial relative movement between the two connecting elements,
   at least one bending joint, the bending joint connected with one of the two connecting elements of the axial damper, and having a mounting element for mounting on one of the two separate components,
   wherein the bending joint has a joint section configured as a continuous rigidly interconnected component and that extends axially between the connecting element connected with the bending joint and the mounting element,
   wherein the bending joint is resiliently bendable in the joint section about at least one axis of rotation that is perpendicular to an axial direction (A),
   wherein the joint section has at least one axial bending section that is associated to exactly one axis of rotation perpendicularly to the axial direction (A) and that remains rigid with respect to a bending stress that is exerted on the bending section by a relative force applied at the axial ends of the bending section with a direction of the force parallel to the axis of rotation,
   wherein the bending section has a shape of a plate, the planar extension of which is fixed by the axial direction (A) and by the axis of rotation associated thereto,
   wherein the bending section has a length of extension in a direction perpendicular to the axial direction (A) and perpendicular to the axis of rotation associated to the bending section that is less than 5% of the axial length of extension of the bending section,
   wherein the bending section has a length of extension along its associated axis of rotation that is at least four times bigger than the length of extension of the bending section in the direction that is perpendicular to its associated axis of rotation and perpendicular to the axial direction.

2. The damping device according to claim 1, wherein the axial damper and the bending joint are separable components of the damping device,
   wherein the bending joint has a fastening section, and
   wherein the bending joint is connected to the one of the two connecting elements of the axial damper by the fastening section.

3. The damping device according to claim 1, wherein the at least one bending joint comprises a first bending joint and a second bending joint,
   wherein the first bending joint is connected to the first connecting element of the axial damper, and
   wherein the second bending joint is connected to the second connecting element of the axial damper.

4. The damping device according to claim 1, wherein the bending joint is configured such that, in case of a stress of the mounting element relative to the connecting element with a force perpendicular to the axial direction (A) and perpendicular to the axis of rotation associated to the bending section, a bending of the bending joint takes place exclusively within the axial extension of the bending section.

5. The damping device according to claim 1, wherein the joint section has a first bending section and a second bending section that are placed one behind the other in the axial direction (A), and wherein the bending joint is bendable in the first bending section about a first axis of rotation that is perpendicular to the axial direction (A) and bendable in the second bending section about a second axis of rotation that is perpendicular to the axial direction (A) and to the first axis of rotation.

6. The damping device according to claim 5, wherein a rigid intermediate section that connects the bending sections is provided in the axial direction (A) between the first bending section and the second bending section.

7. The damping device according to claim 6, wherein the intermediate section has a length of extension in all three dimensions that is at least four times the respective length of extension of the bending sections along the direction perpendicularly to the axial direction (A) and perpendicularly to their respective axis of rotation.

8. The damping device according to claim 1, wherein the at least one bending section is made of only one material.

9. The damping device according to claim 1, wherein the bending joint is made in one piece of one single material.

10. The damping device according to claim 1, wherein the bending joint has a first flange and a second flange,
wherein the bending joint is connected to the one of the two connecting elements of the axial damper by the first flange, and
wherein the second flange forms the mounting element of the bending joint.

11. The damping device according to claim 1, wherein the axial damper is configured as a viscous damper that has a housing and a piston,
wherein the piston is placed axially displaceable with respect to the housing within a range of displacement,
wherein a viscous medium is provided in the housing,
wherein the piston in any position within the range of displacement is placed with a first axial piston section outside the housing and protrudes herewith over a first axial end of the housing and is placed with a second axial piston section inside the housing and is immersed in sections in the viscous medium, and
wherein the first connecting element is placed at the first axial end of the piston and the second connecting element is placed at the second axial end of the housing.

12. A system comprising:
at least one bending joint that has a fastening section, a mounting element spaced in an axial direction (A) from the fastening section and a joint section that connects the fastening section with the mounting element that is configured as a continuous rigidly interconnected component,
wherein the joint section is resiliently bendable about at least one axis of rotation that is perpendicular to the axial direction (A), for mounting an axial damper that is configured to damp relative movements of two components to one another in the axial direction (A),
wherein the joint section of the bending joint has at least one axial bending section that is associated to exactly one axis of rotation perpendicularly to the axial direction (A) and that remains rigid with respect to a bending stress that is exerted on the bending section by a relative force applied at the axial ends of the bending section with a direction of the force parallel to the axis of rotation,
wherein the bending section has a shape of a plate, the planar extension of which is fixed by the axial direction (A) and by the axis of rotation associated thereto,
wherein the bending section has a length of extension in a direction perpendicular to the axial direction (A) and perpendicular to the axis of rotation associated to the bending section that is less than 5% of the axial length of extension of the bending section,
wherein the bending section has a length of extension along its associated axis of rotation that is at least four times bigger than the length of extension of the bending section in the direction that is perpendicular to its associated axis of rotation and perpendicular to the axial direction, and
wherein the bending joint is connected with the fastening section to the axial damper and with the mounting element to one of the two components.

13. A bending joint for a damping device for damping oscillations between two separate components, the bending joint comprising:
a fastening section configured to connect with an axial damper,
a mounting element for mounting on one of the two separate components,
a joint section configured as a continuous rigidly interconnected component and that extends axially between the fastening section and the mounting element,
wherein the bending joint is resiliently bendable in the joint section about at least one axis of rotation that is perpendicular to an axial direction (A),
wherein the joint section has at least one axial bending section that is associated to exactly one axis of rotation perpendicularly to the axial direction (A) and that remains rigid with respect to a bending stress that is exerted on the bending section by a relative force applied at the axial ends of the bending section with a direction of the force parallel to the axis of rotation,
wherein the bending section has a shape of a plate, the planar extension of which is fixed by the axial direction (A) and by the axis of rotation associated thereto,
wherein the bending section has a length of extension in a direction perpendicular to the axial direction (A) and perpendicular to the axis of rotation associated to the bending section that is less than 5% of the axial length of extension of the bending section,
wherein the bending section has a length of extension along its associated axis of rotation that is at least four times bigger than the length of extension of the bending section in the direction that is perpendicular to its associated axis of rotation and perpendicular to the axial direction.

14. The bending joint according to claim 13, wherein the joint section has a first bending section and a second bending section that are placed one behind the other in the axial direction (A), and
wherein the bending joint is bendable in the first bending section about a first axis of rotation that is perpendicular to the axial direction (A) and bendable in the second bending section about a second axis of rotation that is perpendicular to the axial direction (A) and to the first axis of rotation.

15. The bending joint according to claim 14, wherein a rigid intermediate section that connects the bending sections is provided in the axial direction (A) between the first bending section and the second bending section.

16. The bending joint according to claim 15, wherein the intermediate section has a length of extension in all three dimensions that is at least four times the respective length of extension of the bending sections along the direction perpendicularly to the axial direction (A) and perpendicularly to their respective axis of rotation.

17. The bending joint according to claim 13, wherein the at least one bending section is made of only one material.

18. The bending joint according to claim 13, wherein the bending joint is made in one piece of one single material.

19. The bending joint according to claim 13, wherein the bending joint has a first flange and a second flange,
   wherein the bending joint is connected to the one of the two connecting elements of the axial damper by the first flange, and
   wherein the second flange forms the mounting element of the bending joint.

* * * * *